United States Patent
Harshbarger et al.

(10) Patent No.: US 10,208,589 B2
(45) Date of Patent: Feb. 19, 2019

(54) METHODS AND SYSTEMS FOR TRACKING DRILLING EQUIPMENT

(71) Applicant: FORUM US, INC., Houston, TX (US)

(72) Inventors: Chris Harshbarger, Cypress, TX (US); Shane Richard, Tomball, TX (US); Juan Arbelaez, Houston, TX (US)

(73) Assignee: FORUM US, INC., Houston, TX (US)

( * ) Notice: Subject to any disclaimer, the term of this patent is extended or adjusted under 35 U.S.C. 154(b) by 0 days.

(21) Appl. No.: 15/625,036

(22) Filed: Jun. 16, 2017

(65) Prior Publication Data

US 2018/0363454 A1    Dec. 20, 2018

(51) Int. Cl.
*E21B 47/12* (2012.01)
*G06Q 10/00* (2012.01)

(52) U.S. Cl.
CPC .......... *E21B 47/122* (2013.01); *G06Q 10/20* (2013.01)

(58) Field of Classification Search
CPC .............................. E21B 47/122; G06Q 10/20
See application file for complete search history.

(56) References Cited

U.S. PATENT DOCUMENTS

| | | |
|---|---|---|
| 6,600,418 B2 | 7/2003 | Francis et al. |
| 6,659,174 B2 | 12/2003 | Hogan |
| 7,036,729 B2 | 5/2006 | Chung |
| 7,603,296 B2 | 10/2009 | Whiteley et al. |
| 7,962,319 B2 | 6/2011 | Grayson |
| 8,204,697 B2 | 6/2012 | Garvey et al. |
| 8,215,417 B2 | 7/2012 | Annaiyappa et al. |
| 8,825,414 B2 | 9/2014 | Garvey et al. |
| 9,030,324 B2 | 5/2015 | Christiansen et al. |
| 9,260,943 B2 | 2/2016 | Eriksson et al. |
| 9,269,199 B2 | 2/2016 | Laughlin et al. |
| 9,417,160 B2 | 8/2016 | Hunter |
| 9,418,266 B1 | 8/2016 | Malone |
| 9,547,831 B2 | 1/2017 | Laase et al. |
| 9,657,567 B2 | 5/2017 | Malayappalayam Shanmugam et al. |
| 2001/0047283 A1 | 11/2001 | Melick et al. |
| 2005/0230110 A1* | 10/2005 | Ellison .................. E21B 17/006 166/255.1 |
| 2006/0108113 A1* | 5/2006 | Scott .................. B01D 33/0376 166/255.1 |
| 2006/0163350 A1 | 7/2006 | Melton et al. |
| 2008/0024274 A1 | 1/2008 | Ishida et al. |
| 2008/0059411 A1 | 3/2008 | Greiner et al. |
| 2008/0201388 A1 | 8/2008 | Wood et al. |
| 2009/0121895 A1 | 5/2009 | Denny et al. |

(Continued)

FOREIGN PATENT DOCUMENTS

WO    2016186790 A1    11/2016

OTHER PUBLICATIONS

International Search Report and Written Opinion dated Jul. 25, 2018, Corresponding to Application No. PCT/US2018/032102.

*Primary Examiner* — Nader Bolourchi

(74) *Attorney, Agent, or Firm* — Patterson + Sheridan LLP

(57) ABSTRACT

A drilling equipment tracking system includes a piece of drilling equipment and a traceability tag coupled to the piece of drilling equipment. The traceability tag has a unique identifier. A mobile device is configured to obtain the unique identifier and access a remote server containing an equipment file corresponding to the piece of drilling equipment based on the unique identifier.

10 Claims, 3 Drawing Sheets

(56) References Cited

U.S. PATENT DOCUMENTS

| | | | |
|---|---|---|---|
| 2009/0188675 A1* | 7/2009 | Bloom | E21B 15/00 166/381 |
| 2009/0205820 A1* | 8/2009 | Koederitz | E21B 10/00 166/250.01 |
| 2009/0208295 A1* | 8/2009 | Kinert | E21B 17/006 405/224.2 |
| 2009/0223200 A1* | 9/2009 | Kinert | B07B 1/42 59/84 |
| 2015/0332073 A1 | 11/2015 | Murphy | |
| 2016/0247117 A1 | 8/2016 | Rogers et al. | |
| 2016/0291201 A1* | 10/2016 | Tunc | G01V 15/00 |
| 2016/0306831 A1 | 10/2016 | Holmes et al. | |
| 2017/0030181 A1* | 2/2017 | Thomas | E21B 44/04 |
| 2017/0213196 A1* | 7/2017 | Sheley | G06Q 10/20 |

\* cited by examiner

METHODS AND SYSTEMS FOR TRACKING DRILLING EQUIPMENT

BACKGROUND

Field

Embodiments of the disclosure relate to methods and systems for tracking various types of drilling equipment.

Description of the Related Art

In a drilling operation or rig work-over operation, whether on a water-based (offshore) or a land-based drilling rig, drilling equipment, such as catwalks, elevators, iron roughnecks, and other tubular handling tools, are utilized extensively and repeatedly. This drilling equipment is typically subject to heavy loads and/or multiple cycles that tend to wear out the critical components of the equipment. Extensive wear of critical components can lead to major damage and/or unexpected breakdown of the drilling equipment, both of which increase cost of a drilling operation.

It is important therefore to track the drilling equipment and the service records of the equipment to prevent accidents and unexpected downtime. However, the drilling equipment and/or the service records of the equipment are frequently moved from job to job and handled by multiple personnel, which makes it difficult to trace each piece of drilling equipment while maintaining consistent and accurate service records.

Therefore there is a need for new and improved methods and systems for tracking drilling equipment.

SUMMARY

In one embodiment, a drilling equipment tracking system comprises a piece of drilling equipment; a traceability tag coupled to the piece of drilling equipment, wherein the traceability tag has a unique identifier; and a mobile device configured to obtain the unique identifier and access a remote server containing an equipment file corresponding to the piece of drilling equipment based on the unique identifier.

In one embodiment, a method of tracking a piece of drilling equipment comprises accessing a remote server via a mobile device; scanning a traceability tag of the piece of drilling equipment to obtain a unique identifier; retrieving an equipment file corresponding to the piece of drilling equipment from the remote server based on the unique identifier; and viewing the equipment file onto the mobile device.

BRIEF DESCRIPTION OF THE DRAWINGS

So that the manner in which the above-recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Embodiments disclosed herein relate to a drilling equipment tracking system having a traceability tag used to help track the equipment and the service records of the equipment. The traceability tag may be an active or passive radio frequency identification (RFID) tag embedded in the equipment to facilitate identification of the equipment, service records of the equipment, information on equipment cycles (e.g., the number of cycles the equipment has been operated and/or weight per cycle), certifications of the equipment, repairs of the equipment, modifications of the equipment, field issues with the equipment, as well as other operation and/or service related information. The traceability tag may be coupled to the exterior of the drilling equipment, or disposed in a bore formed in equipment and then optionally covered with a protective capping material. The information of the drilling equipment may be accessed on-demand by personnel onsite and/or remotely.

Figure 1:
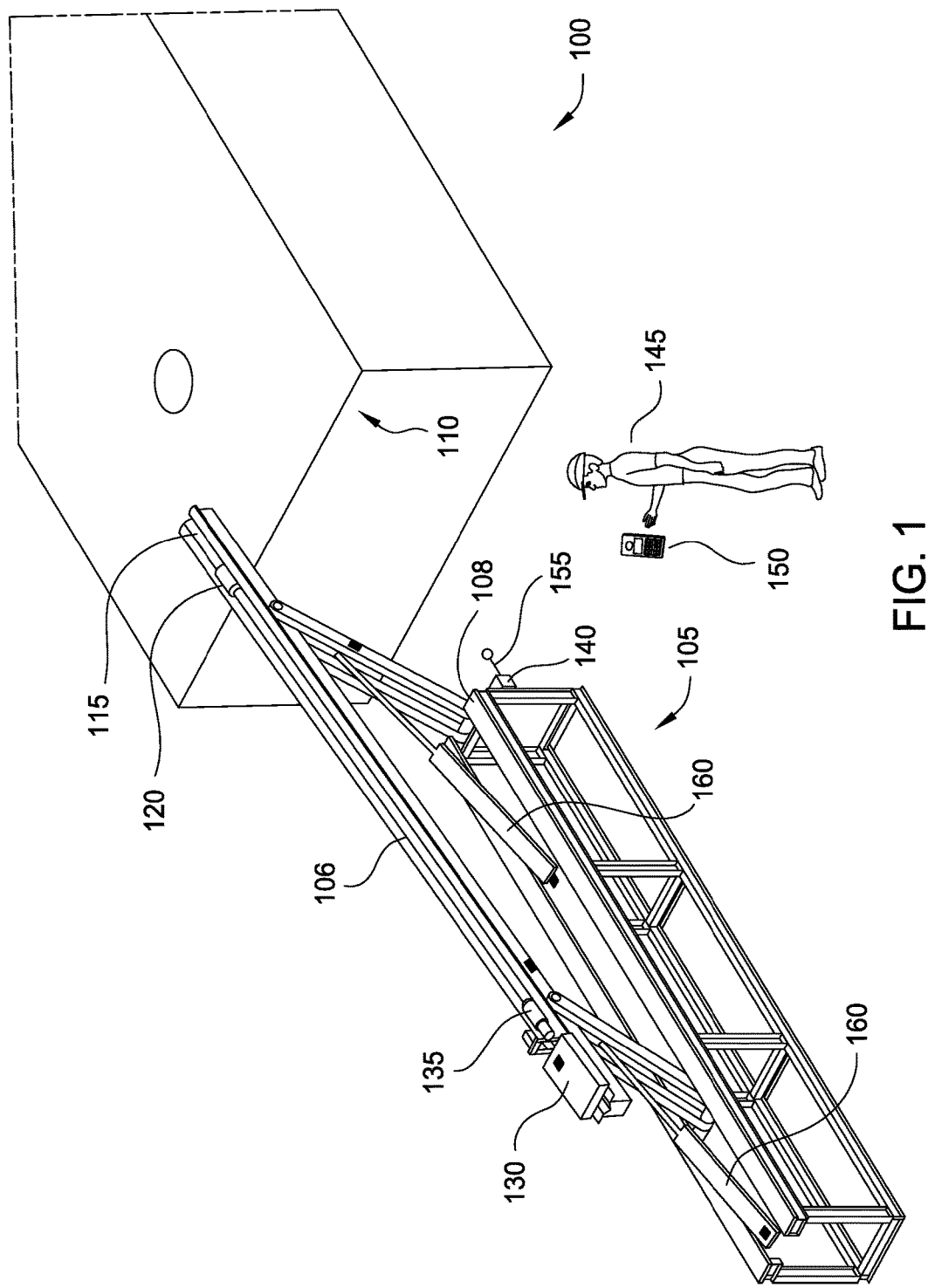
FIG. 1 is a schematic of a catwalk having a traceability tag according to one embodiment.

FIG. 1 is a schematic of a catwalk 105 next to a rig 100. The catwalk 105 depicted in FIG. 1 is only one example of the various types of drilling equipment that the embodiments disclosed herein can be used with to track. Other examples of drilling equipment include but are not limited to elevators, mud pumps, tubular handling tools, etc.

The catwalk 105 is configured to convey a tubular 106 between a staging rack 108 and a rig floor 110. The catwalk 105 includes a trough 115 that is raised and lowered by one or more piston/cylinders 160, and along which the tubular 106 is conveyed to and from the drill floor 110. The tubular 106 has a box end 120 that may be engaged by a lifting device, such as an elevator on the rig 100, to transfer the tubular 106 to and from the catwalk 105 and the drill floor 110. A skate 130 may engage a pin end 135 of the tubular 106 and push or pull the tubular 106 along the length of the trough 115 during transfer of the tubular 106.

A traceability tag 140 is coupled to the catwalk 105. The traceability tag 140 is configured to help track information about the equipment, which includes, but is not limited to, operation manuals, service records, test reports, identification papers, drawings, maintenance history, certifications, and notes indicating field issues, field repairs, etc. The information accessible in relation to the traceability tag 140 may be obtained by an operator 145 having a mobile device 150, such as a laptop, a mobile phone, an electronic tablet, and/or any other type of device that can be connected to the internet via WiFi, Bluetooth, or other form of wired or wireless communication. The traceability tag 140 may include a transmitter 155 to connect with the mobile device 150. The operator 145 having the mobile device 150 can get immediate access to up-to-date, complete, and accurate information about the catwalk 105 that is tracked using the traceability tag 140 via the internet using the mobile device 150.

Figures 2A, 2B:
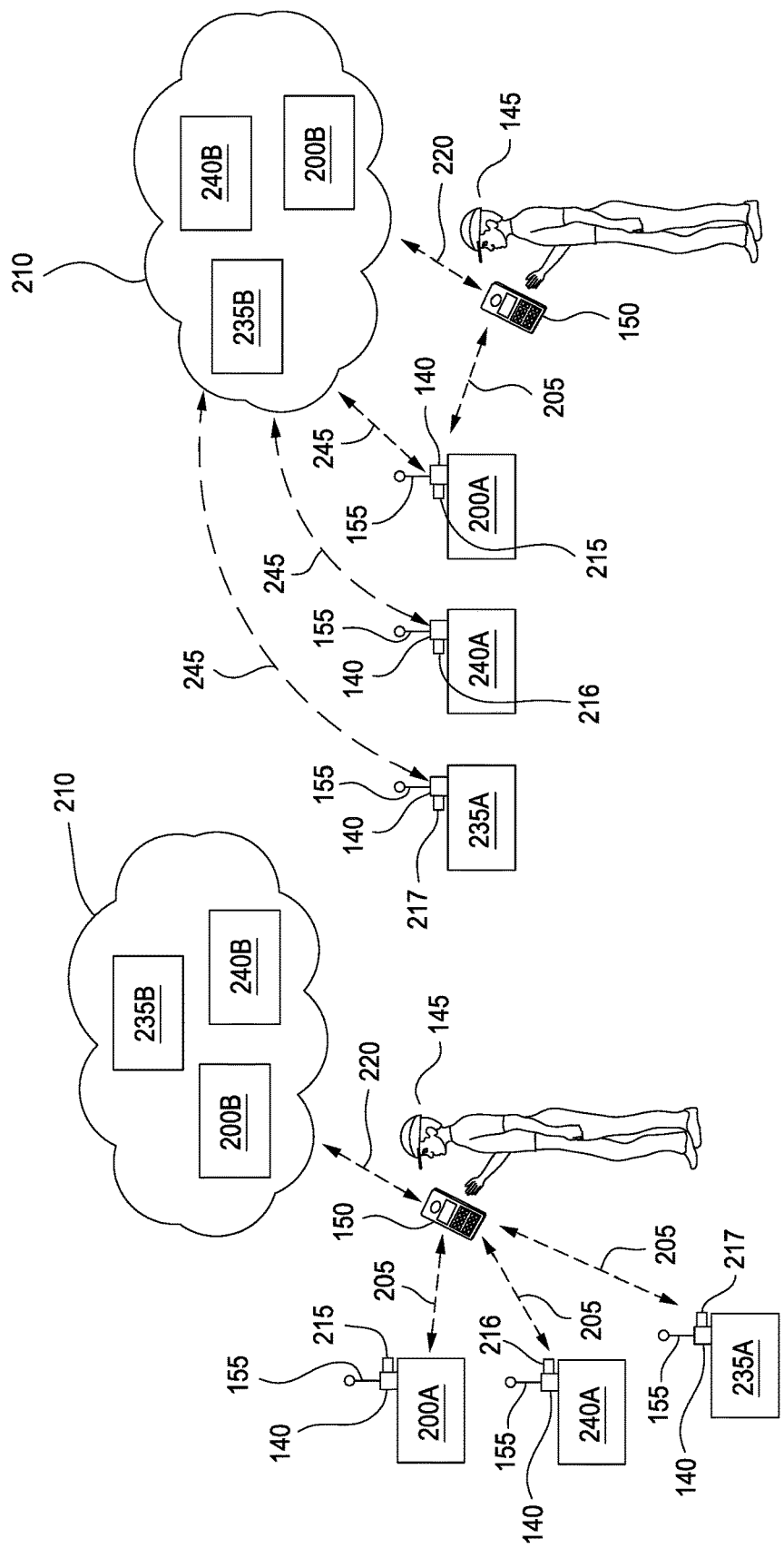
FIG. 2A is a schematic of an access procedure utilized to obtain information from drilling equipment.
FIG. 2B is a schematic view of another access procedure utilized to obtain information from drilling equipment.

FIG. 2A is a schematic of an access procedure utilized to obtain information from one or more pieces of drilling equipment 200A, 235A, 240A. The drilling equipment 200A, 235A, 240A may be the catwalk 105 of FIG. 1 or may be another type of drilling equipment such as an elevator, a mud pump, or other equipment used with the rig 100 of FIG. 1. Each piece of drilling equipment 200A, 235A, 240A has a traceability tag 140, as described above, and each traceability tag 140 has a unique identifier 215, 216, 217, respectively. The mobile device 150 is configured to access drilling equipment files 200B, 235B, 240B that contain information about the corresponding drilling equipment 200A, 235A, 240A based on the unique identifier 215, 216, 217 of that piece of equipment's traceability tag 140.

The drilling equipment files 200B, 235B, 240B may be accessed via the internet and maintained on a remote server 210, such as a "cloud" database, or other type of database accessible by the internet. Each drilling equipment file 200B, 235B, 240B includes information unique to the piece of equipment 200A, 235A, 240A and the traceability tag 140 that it relates to. The information includes, but is not limited to, operation manuals, service records, test reports, identification papers, drawings, maintenance history, certifications, and notes indicating field issues, field repairs, etc.

In FIG. 2A, each traceability tag 140 is a passive tag that only responds when queried (e.g. when scanned) and cannot communicate directly with the remote server 210. The operator 145 having the mobile device 150 may gain access to the drilling equipment files 200B, 235B and 240B based on the unique identifier 215, 216, 217 of the traceability tag 140 that is queried by the operator 145 via the mobile device 150, such as by scanning the traceability tag 140.

The traceability tag 140 interacts with a mobile application (software known as an "app") previously downloaded onto the mobile device 150 via the transmitter 155 and establishes an identification link 205 therebetween. The traceability tag 140 sends its unique identifier 215, 216, 217 across the identification link 205 to the mobile device 150 to identify the piece of equipment 200A, 235A, 240A that it is attached to. After identification is verified, a communications link 220 is established between the mobile device 150 and the remote server 210.

According to one example, the mobile device 150 may be used to query the traceability tag 140 that is attached to the piece of drilling equipment 200A. In response, the traceability tag 140 provides its unique identifier 215 that is specific to that piece of drilling equipment 200A. The unique identifier 215 is used to match the piece of drilling equipment 200A with the appropriate drilling equipment file 200B within the remote server 210 using the communications link 220. Then, the operator 145 using the mobile device 150 may download the drilling equipment file 200B from the remote server 210 using the communications link 220 to obtain information specific to the drilling equipment 200A. The downloaded information may be viewed on the mobile device 150. Access to the drilling equipment file 200B may be obtained at any location with access to the internet, such as any location on or around a rig, at a repair facility, at location storing the drilling equipment 200A, or any other place with access to the Internet.

The operator 145 may make updates to the drilling equipment file 200B using the mobile device 150. For example, any issues with the drilling equipment 200A can be uploaded to the drilling equipment file 200B by the operator 145. If service is performed on the drilling equipment 200A, service records can be uploaded to the drilling equipment file 200B by the operator 145. This information may be used to predict the end of the life of the equipment, when future maintenance or service will be needed, and any potential problems that might exist with the equipment.

The remote server 210 may contain any number of drilling equipment files, such as drilling equipment files 235B, 240B, both of which may correspond to different pieces and/or types of drilling equipment. For example, the drilling equipment file 235B may be a file on another catwalk (similar to the catwalk 105 of FIG. 1, but different than the catwalk 105 of FIG. 1). For another example, the drilling equipment file 240B may not be a file for a catwalk and instead be a file for another type of drilling equipment, such as an elevator. Each piece of drilling equipment 200A, 235A, 240A, however, has a traceability tag 140 with its own unique identifier, such as the unique identifiers 215, 216, 217 as described above.

FIG. 2B is a schematic of another access procedure utilized to obtain information from the one or more pieces of drilling equipment 200A, 235A, 240A. The embodiments described with respect to FIG. 2A can be used with the embodiments described with respect to FIG. 2B. One difference between the embodiments shown in FIG. 2A and the embodiments shown in FIG. 2B is that the traceability tags 140 in FIG. 2B may be active tags that include a power source, such as a battery, and can actively communicate with the remote server 210 and/or the mobile device 150.

According to one example, information corresponding to the drilling equipment 200A can be uploaded to the drilling equipment file 200B via a connection between the traceability tag 140 and the remote server 210. The traceability tag 140 may provide an active-sync link 245 between the remote server 210 and the traceability tag 140 such as via the transmitter 155. Information corresponding to the drilling equipment 200A can be uploaded to the corresponding drilling equipment file 200B via the active-sync link 245.

The active-sync link 245 may be initiated by the operator 145 with the mobile device 150. The active-sync link 245 may be initiated automatically between the remote server 210 and the traceability tag 140 at predetermined times and/or for specific time periods. The active-sync link 245 may initiated when the drilling equipment 200A is in use or at a predetermined time after use.

As shown in FIG. 2B, one or all of the pieces of drilling equipment 200A, 235A, 240A may be in communication with the corresponding drilling equipment files 200B, 235B, 240B as identified by unique identifiers 215, 216, 217 of traceability tags 140 via respective active-sync links 245.

Figure 3:
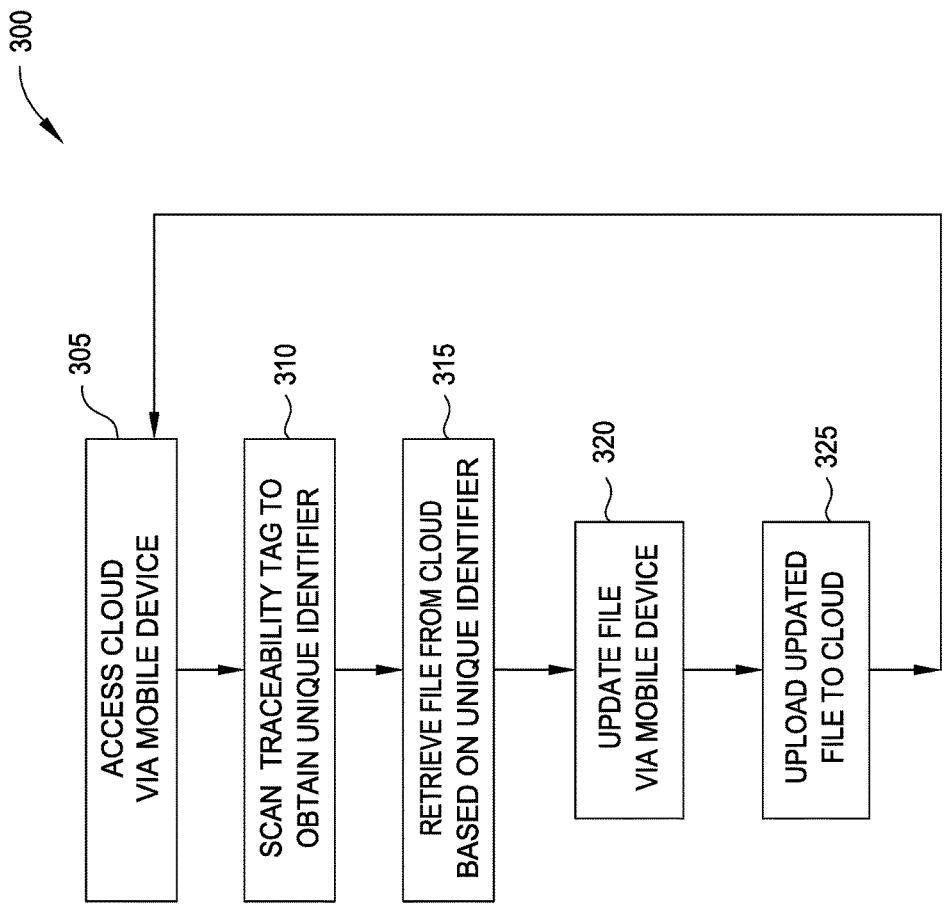
FIG. 3 is a flowchart depicting a method of tracking drilling equipment according to one embodiment.

FIG. 3 is a flowchart depicting a method 300 of tracking drilling equipment according to one embodiment. At 305, the remote server 210 (e.g., the "cloud") is accessed via the mobile device 150. The access between the mobile device 150 and the remote server 210 may be the communications link 220 as described above and may be a wired or wireless form of communication.

At 310, the traceability tag 140 is scanned to obtain the unique identifier that is specific to that piece of drilling equipment (e.g., unique identifier 215 of traceability tag 140 of drilling equipment 200A). Once the unique identifier is obtained, the drilling equipment file specific to that piece of drilling equipment based on the unique identifier (e.g., drilling equipment file 200B corresponding to drilling equipment 200A based on unique identifier 215) is retrieved from the cloud via the mobile device 150, as shown at 315. Once retrieved, the operator 145 may download and/or view the information contained in the drilling equipment file that relates to the specific piece of drilling equipment on the mobile device 150. At 320, optionally, the operator 145 may update the drilling equipment file using the mobile device 150. At 325, the file if updated may be uploaded back to the cloud at 325.

While the foregoing is directed to embodiments of the disclosure, other and further embodiments may be devised without departing from the basic scope thereof, and the scope thereof is determined by the claims that follow.

The invention claimed is:

1. A drilling equipment tracking system, comprising:
   a catwalk configured to convey a tubular to and from a rig floor;
   a traceability tag coupled to the catwalk, wherein the traceability tag has a unique identifier; and
   a mobile device configured to obtain the unique identifier and access a remote server containing an equipment file corresponding to the catwalk based on the unique identifier, wherein the traceability tag comprises a transmitter configured to communicate directly with the mobile device and directly with the remote server, and wherein the traceability tag is configured to automatically initiate an active-sync link with the remote server at predetermined times to update the equipment file.

2. The system of claim 1, wherein the traceability tag comprises a radio frequency identification tag.

3. The system of claim 1, wherein the mobile device communicates with the traceability tag via wired or wireless communication.

4. The system of claim 1, wherein the equipment file contains information about the catwalk including operation manuals, service records, test reports, identification papers, drawings, maintenance history, certifications, notes on field issues, and notes on field repairs.

5. A method of tracking a catwalk, comprising:
   accessing a remote server via a mobile device;
   scanning a traceability tag coupled to the catwalk to obtain a unique identifier, wherein the traceability tag comprises a transmitter configured to transmit the unique identifier directly to the mobile device and directly to the remote server;
   retrieving an equipment file corresponding to the catwalk from the remote server based on the unique identifier;
   viewing the equipment file on the mobile device; and
   automatically initiating an active-sync link between the traceability tag and the remote server at predetermined times to update the equipment file.

6. The method of claim 5, wherein the traceability tag comprises a radio frequency identification tag.

7. The method of claim 5, further comprising updating the equipment file via the mobile device.

8. The method of claim 7, further comprising uploading the updated equipment file to the remote server.

9. The method of claim 5, further comprising downloading the equipment file onto the mobile device.

10. The method of claim 5, wherein the equipment file contains information about the catwalk including operation manuals, service records, test reports, identification papers, drawings, maintenance history, certifications, notes on field issues, and notes on field repairs.

* * * * *